(12) United States Patent
Nelson

(10) Patent No.: US 11,498,608 B2
(45) Date of Patent: Nov. 15, 2022

(54) HYDRAULIC BI-DIRECTIONAL FLOW SWITCHES

(71) Applicant: Deere & Company, Moline, IL (US)

(72) Inventor: Frederick William Nelson, Waukee, IA (US)

(73) Assignee: Deere & Company, Moline, IL (US)

( * ) Notice: Subject to any disclaimer, the term of this patent is extended or adjusted under 35 U.S.C. 154(b) by 532 days.

(21) Appl. No.: 16/575,042

(22) Filed: Sep. 18, 2019

(65) Prior Publication Data

US 2020/0010109 A1 Jan. 9, 2020

Related U.S. Application Data

(62) Division of application No. 15/274,722, filed on Sep. 23, 2016, now Pat. No. 10,421,478.

(Continued)

(51) Int. Cl.
| | |
|---|---|
| *B62D 3/14* | (2006.01) |
| *B62D 5/06* | (2006.01) |
| *B62D 1/28* | (2006.01) |
| *F16K 31/122* | (2006.01) |
| *F16K 37/00* | (2006.01) |
| *F15B 15/14* | (2006.01) |

(Continued)

(52) U.S. Cl.
CPC ............... *B62D 3/14* (2013.01); *B62D 1/286* (2013.01); *B62D 5/062* (2013.01); *F15B 15/149* (2013.01); *F16K 31/122* (2013.01); *F16K 37/0041* (2013.01); *F15B 15/2861* (2013.01); *H01H 36/002* (2013.01)

(58) Field of Classification Search
CPC .......... B62D 3/14; B62D 1/286; B62D 5/062; F15B 15/149; F16K 31/122; F16K 37/0041; H01H 36/002
See application file for complete search history.

(56) References Cited

U.S. PATENT DOCUMENTS

| | | | |
|---|---|---|---|
| 5,405,248 | A | 4/1995 | Alschweig et al. |
| 6,067,782 | A | 5/2000 | Diekhans |

(Continued)

FOREIGN PATENT DOCUMENTS

| | | | | |
|---|---|---|---|---|
| CN | 203906970 | | 10/2014 | |
| DE | 19745897 | A1 * | 4/1999 | ............. B62D 5/062 |

(Continued)

OTHER PUBLICATIONS

TE Connectivity, "Truck Rear Axle Steering Sensor," Handout, May 2016, 1 page.

(Continued)

*Primary Examiner* — Jacob D Knutson
(74) *Attorney, Agent, or Firm* — Hanley, Flight & Zimmerman, LLC

(57) ABSTRACT

Hydraulic bi-directional flow switches are disclosed. A disclosed example apparatus includes a piston disposed in a fluid channel between a first fluid connection and a second fluid connection, where the first and second fluid connections define a fluid pathway for hydraulic steering fluid. The example apparatus also includes a detector to detect a movement of the piston away from a default position of the piston, where the piston is to displace from the default position when the hydraulic steering fluid flows along the fluid pathway.

13 Claims, 8 Drawing Sheets

Related U.S. Application Data

(60) Provisional application No. 62/371,909, filed on Aug. 8, 2016.

(51) Int. Cl.
   *H01H 36/00* (2006.01)
   *F15B 15/28* (2006.01)

(56) References Cited

U.S. PATENT DOCUMENTS

| | | |
|---|---|---|
| 9,120,504 B2 | 9/2015 | Bebemes et al. |
| 2009/0008583 A1 | 1/2009 | Grethel |
| 2014/0025260 A1* | 1/2014 | McClure ............... B62D 1/286 701/41 |
| 2015/0033941 A1 | 2/2015 | Kouketsu et al. |
| 2015/0175194 A1* | 6/2015 | Gattis ..................... B62D 1/22 701/41 |
| 2015/0315963 A1* | 11/2015 | Graichen ............ F16K 37/0041 415/148 |
| 2015/0330530 A1* | 11/2015 | Sealy ..................... F01K 23/10 137/538 |
| 2018/0009471 A1* | 1/2018 | Novacek ............. F15B 13/0401 |

FOREIGN PATENT DOCUMENTS

| | | | |
|---|---|---|---|
| DE | 60305812 T2 * | 11/2006 | ............. B62D 5/062 |
| DE | 102012212105 A1 * | 5/2013 | ............... B62D 5/06 |
| EP | 1728706 | 12/2006 | |
| EP | 2336003 | 6/2011 | |
| EP | 2366926 | 9/2011 | |

OTHER PUBLICATIONS

European Patent Office, "European Search Report," issued in connection with European Patent Application No. EP17184223.0, dated Jul. 2, 2018, 10 pages.

United States Patent and Trademark Office, "Requirement for Restriction/Election," issued in connection with U.S. Appl. No. 15/274,722, dated Sep. 19, 2018, 7 pages.

United States Patent and Trademark Office, "Non-Final Office Action," issued in connection with U.S. Appl. No. 15/274,722, dated Nov. 14, 2018, 35 pages.

United States Patent and Trademark Office, "Notice of Allowance and Fee(s) Due," issued in connection with U.S. Appl. No. 15/274,722, dated May 7, 2019, 16 pages.

* cited by examiner

HYDRAULIC BI-DIRECTIONAL FLOW SWITCHES

RELATED APPLICATIONS

This patent arises as a divisional of U.S. patent application Ser. No. 15/274,722, which was filed on Sep. 23, 2016 and which claims the benefit under 35 U.S.C. § 119(e) to U.S. Provisional Application 62/371,909 titled "HYDRAULIC BI-DIRECTIONAL FLOW SWITCHES," filed Aug. 8, 2016. The foregoing applications are hereby incorporated herein by this reference in their entireties.

FIELD OF THE DISCLOSURE

This disclosure relates generally to hydraulic steering systems, and more particularly, to hydraulic bi-directional flow switches.

BACKGROUND

Automated steering systems used in working machines such as tractors, combines or forage harvesters, for example, utilize sensors (e.g., visual sensors, pressure sensors, movement sensors, etc.) to detect when a user has engaged controls. Such automated steering systems control flow of hydraulic fluid through a hydraulic steering system that can be disengaged when a user turns a steering wheel to manually control the steering, for example. By doing so, the user takes control of the hydraulic steering system. Automated steering systems are disengaged so that the user can correct movement of a working machine and/or take control of the working machine (e.g., to return the working machine to storage, etc.).

To detect whether the user has engaged the steering wheel, some known automated steering systems use a flow meter to detect movement of the steering wheel. In particular, such flow meters can be used to detect a movement of hydraulic fluid through a hydraulic steering system. Other known systems use external detection sensors and/or pressure/force sensors to determine whether the user has moved and/or directed the steering wheel. These known systems typically have a relatively high cost and associated complexity (e.g., additional electronics, system integration and/or software) to implement these sensors.

SUMMARY

An example apparatus includes a piston disposed in a fluid channel that is between a first fluid connection and a second fluid connection, where the first and second fluid connections define a fluid pathway for hydraulic steering fluid. The example apparatus also includes a detector to detect a movement of the piston away from a default position of the piston, where the piston is to displace from the default position when the hydraulic steering fluid flows along the fluid pathway.

Figure 1:
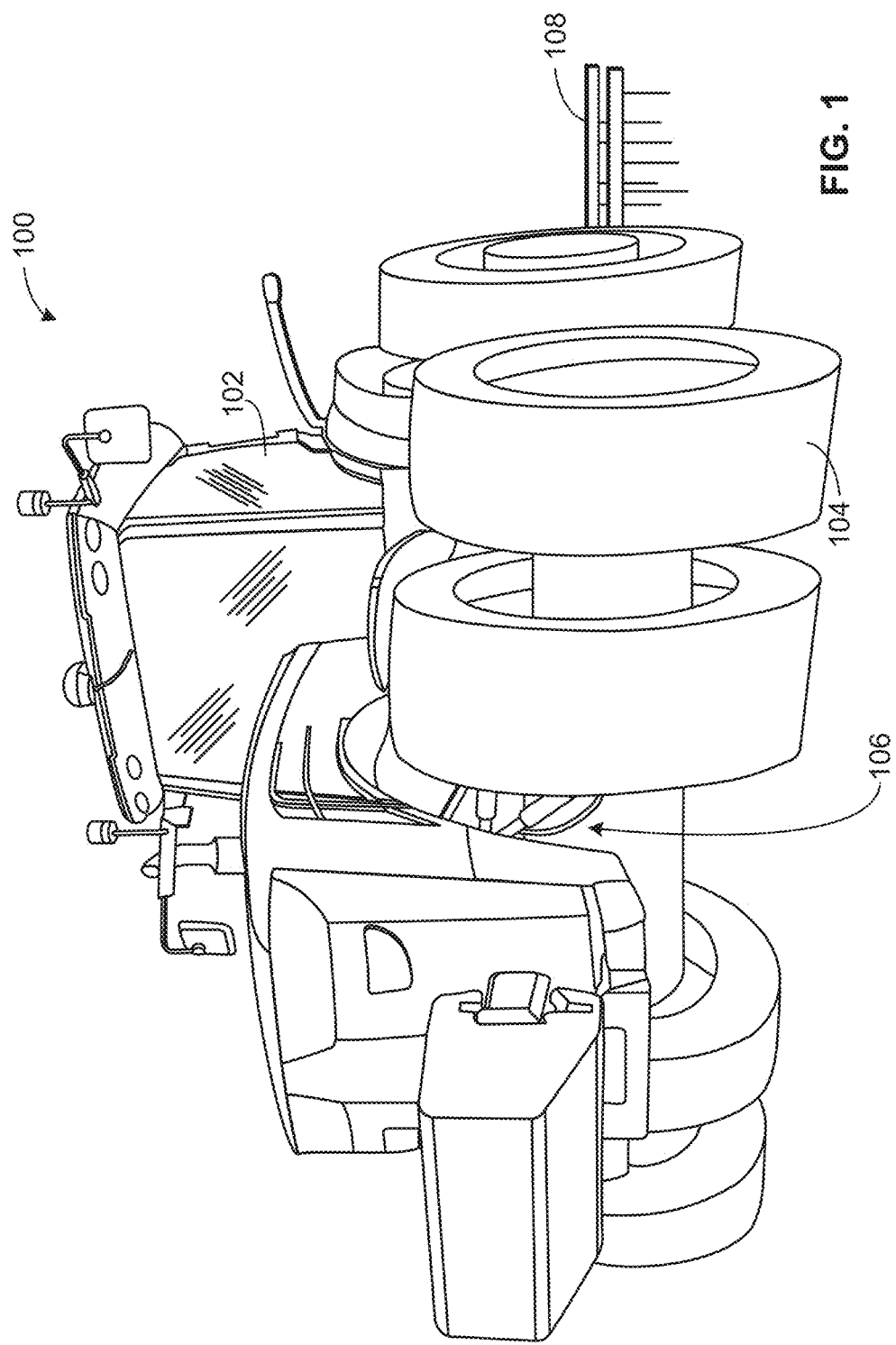
FIG. 1 is an example working machine in which the examples disclosed herein may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Hydraulic bi-directional flow switches are disclosed herein. Known automated steering system typically disengage once a user moves a steering wheel. In particular, some known systems include a flow meter that may be used to detect a movement and/or flow of hydraulic fluid through a hydraulic steering system. Other known systems use external detection sensors and/or pressure/force sensors to determine whether a user has moved and/or directed the steering wheel. These known systems typically have a relatively high cost and associated complexity to implement. In particular, these known systems may rely on sensor placement or additional hardware and/or software (e.g., additional associated electronics and/or programming) required to detect a user moving/rotating a steering wheel.

The examples disclosed herein enable reliable and cost-effective detection of user input applied to a steering wheel (e.g., a user engaging and moving a steering wheel). In particular, the examples disclosed herein utilize detection of a movement and/or displacement of a piston that is in fluid communication with hydraulic fluid of a hydraulic steering system so that an automated steering system may be disengaged, for example. As a result of utilizing the hydraulic fluid for detection, the examples disclosed herein also enable detection of flow under relatively high pressure, in which many flow meters may not be able to withstand.

In some examples, the aforementioned piston is disposed between a steering valve connection and a steering cylinder connection, and centered into a default position based on the hydraulic fluid. In some examples, the piston is spring-loaded and/or partially moved by a spring into its respective default position (e.g., centered position). In some examples, a magnetic sensor is used to determine a change in magnetic field (e.g., from a magnet) based on movement of the piston. In some examples, the piston is guided by a guide rod. In some examples, the piston has a detection portion (e.g., a wider portion) and/or an attachment (e.g., an attached part) to be detected by a magnetic field sensor.

FIG. 1 is an example working machine 100 in which the examples disclosed herein may be implemented. The working machine 100 of the illustrated example includes a cab 102, tires 104, a steering system 106, and a working implement (e.g., a harvester portion) 108. In this example, the working machine 100 is a tractor.

In operation, the working machine 100 of the illustrated example may be directed by an automated steering system (e.g., a visually guided steering system). In particular, manual control may be dis-engaged while the working machine 100 uses cameras, sensors and/or guidance systems such as a global positioning system (GPS) to automatically direct the steering system 106 to rotate the tires 104 while the working machine 100 drives in a forward direction, for example. In this example, the automated steering system is dis-engaged when a user moves and/or takes control of a steering wheel in the cab 102.

While the example of FIG. 1 is shown as a tractor. The examples disclosed herein may be applied to any appropriate vehicle, working machine and/or control system that utilizes hydraulic fluid. As a result, the examples disclosed herein may be applied to boats, automobiles, etc. or any other appropriate application(s).

Figure 2:
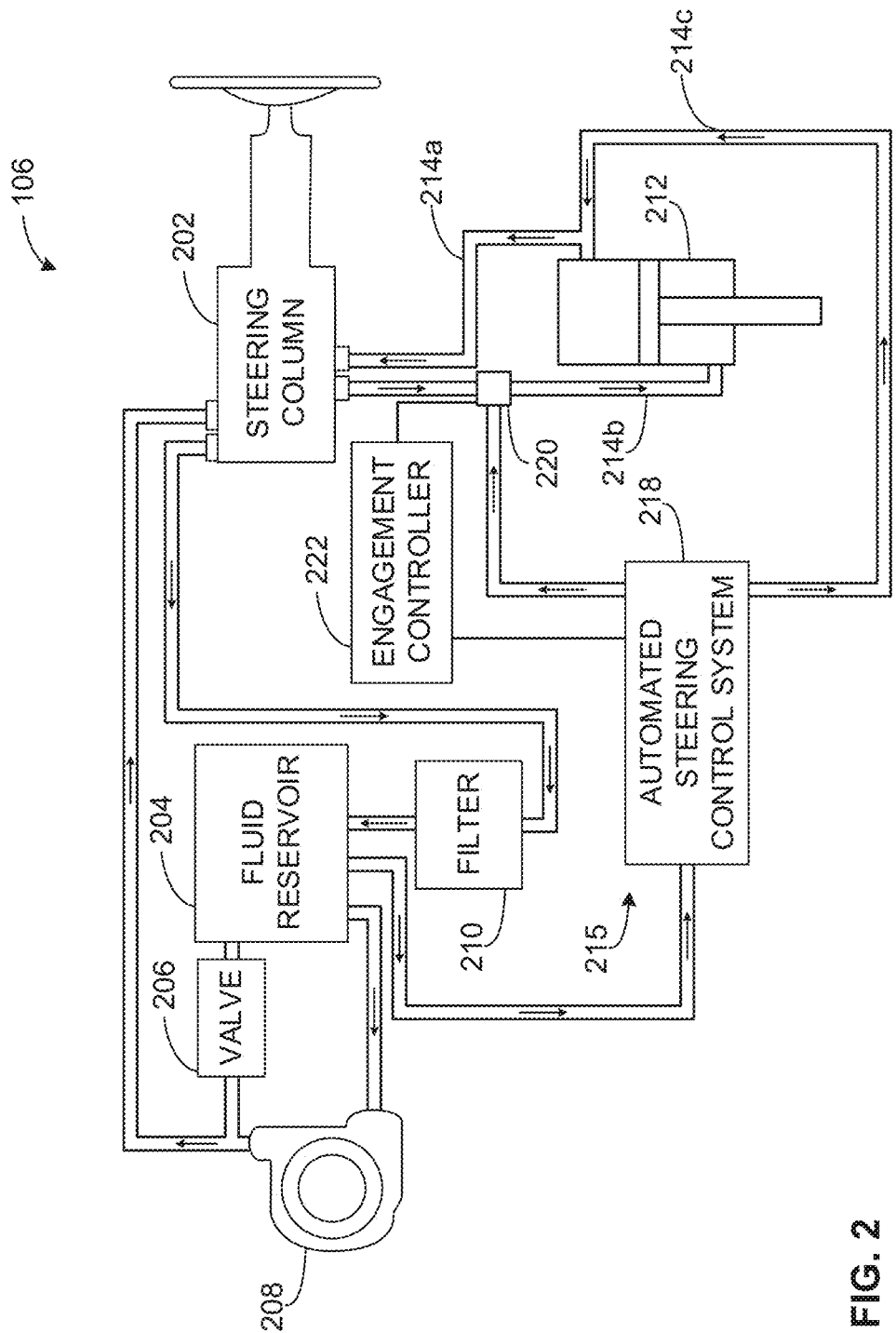
FIG. 2 is an example steering system of the example working machine of FIG. 1.

FIG. 2 illustrates the example steering system 106 of the example working machine 100 of FIG. 1. The steering system 106 of the illustrated example includes a steering column 202, a hydraulic fluid reservoir 204, a relief valve 206, a hydraulic fluid pump 208, a filter 210 and a steering cylinder 212. According to the illustrated example, the steering system 106 also includes a first fluid supply line 214a and a second fluid supply line 214b. In this example, the steering system 106 also includes an automated control portion 215, which includes an automated steering hydraulic pump system 218 that is fluidly coupled to both the fluid reservoir and a junction (e.g., a fluid valve switch) 220 that interfaces with the fluid supply line 214b. In addition, fluid supply line 214c fluidly couples the automated steering control system 218 to the steering cylinder 212. In this example, an engagement controller 222 is communicatively coupled to the junction 220 as well as the automated steering hydraulic pump system 218.

To direct movement of the steering cylinder 212 by moving/rotating the steering system 106 described above in connection with FIG. 1, a steering wheel of the steering wheel column 202 is rotated which, in turn, causes the hydraulic fluid pump 208 to move and/or pump hydraulic fluid through the second fluid supply line 214b, thereby causing the steering cylinder 212 to displace. As a result, the steering system 106 is then rotated. In this example, the hydraulic fluid is returned to the filter 210 and the reservoir 204 via the first fluid supply line 214a. In some examples, an additional automated hydraulic line and/or additional pump is fluidly coupled to the steering cylinder 212 (e.g., an added pump input for automated control of the steering cylinder 212).

To allow automated control of the steering cylinder 212, the automated steering system 218 of the illustrated example is directed by the engagement controller 222 to provide hydraulic fluid to the junction 220, which may function as a bypass valve between manual control from the steering color 202 or automated control from the steering system 218. In particular, the example automated steering system 218 receives control signals (e.g., from a navigation system, a GPS based control system, etc.) and controls an appropriate fluid flow rate and/or pressure of the hydraulic fluid is provided to the steering cylinder 212. As a result, the junction 220 acts as a fluid flow switch.

Figure 3A:
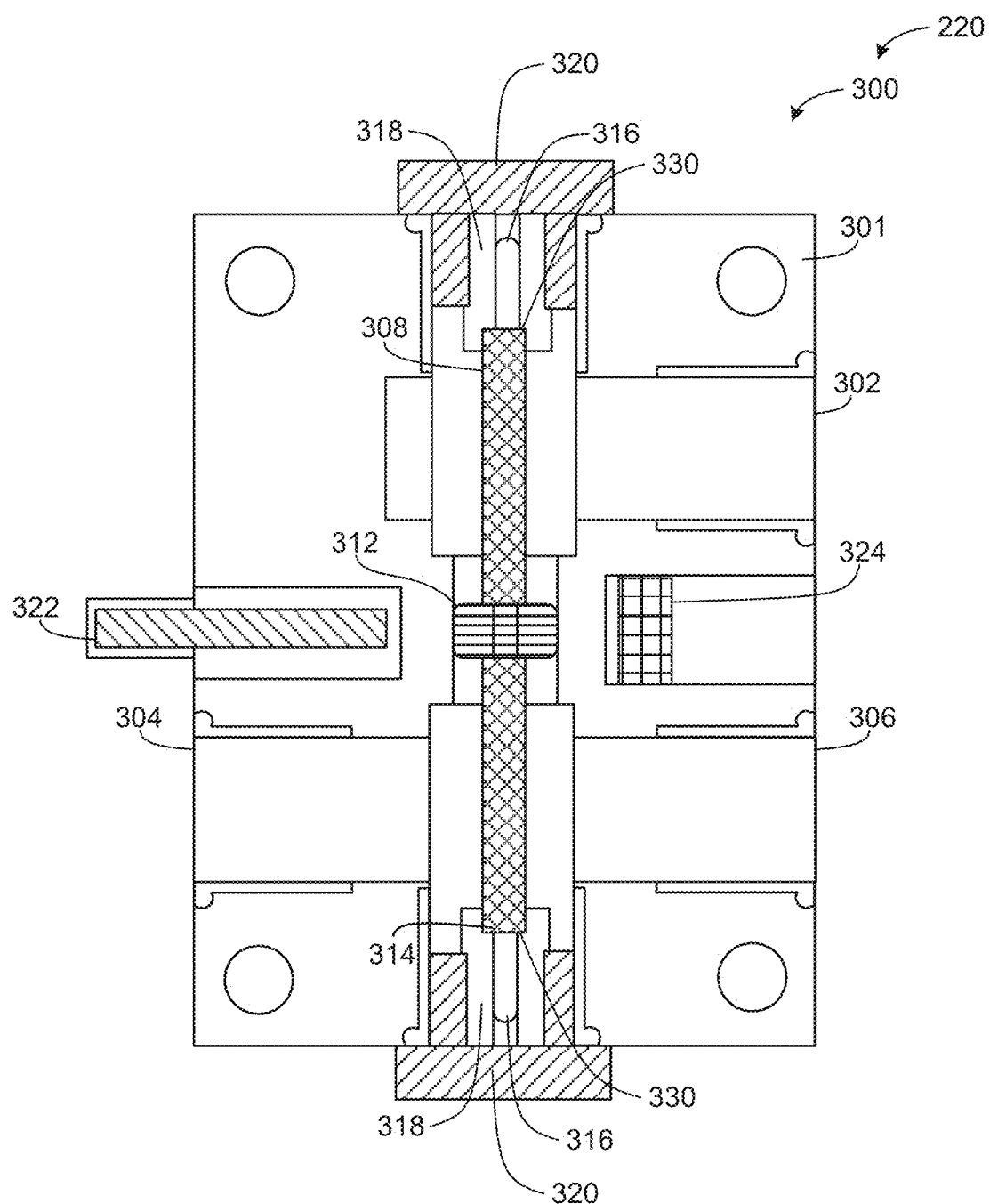
FIG. 3A is a cross-sectional view of an example bi-directional flow switch in accordance with the teachings of this disclosure.

FIG. 3A is a cross-sectional view of an example bi-directional flow switch (e.g., a fluid junction, a fluid connection, etc.) 300 in accordance with the teachings of this disclosure. The example bi-directional flow switch 300 may be implemented at the junction 220 (i.e., between the steering column 202 and the steering cylinder 212), for example. Additionally or alternatively, the bi-directional flow switch 300 (or multiple bi-directional flow switches 300) may be implemented at other portions of the steering system 106. As can be seen in the illustrated example of FIG. 3A, a fluid path/passageway is defined in a valve body 301 between a steering valve connection (e.g., flow path, orifice, passageway, opening etc.) 302, an automatic steering valve connection (e.g., an automated steering valve connection, an automated hydraulic input, etc.) 304, and a steering cylinder connection 306. The example bi-directional switch 300 also includes a piston (e.g., a flow cylinder, a hollow cylinder, etc.) 308 with a detection portion (e.g., an enlarged portion, a ring portion, etc.) 312 and an internal bore 314, a guide rod 316, springs 318 and plugs (e.g., seals, gaskets, etc.) 320. The example flow switch 300 also includes a proximity detection sensor 322 and a corresponding magnet 324. In this example, the proximity detection sensor 322 is a magnetic field sensor such as a Hall Effect sensor, for example. In this example, the piston 308 is at least partially composed of a magnetic/magnetized steel material. However, any appropriate material and/or magnetic material may be used. In this example, the valve body 301 is at least partially composed of a non-magnetic material (e.g., aluminum, brass, etc.). In particular, the steering valve 302 defines a first fluid connection to the steering column 202. Similarly, the steering cylinder connection 306 defines a second fluid connection to the steering column 202 and the automatic steering valve connection 304 defines a third fluid connection to the automated steering system 218.

To allow hydraulic fluid to bypass flowing past a length of the piston 308 (e.g., a long a transverse direction of the piston 308) in an automated steering mode, hydraulic fluid flowing between the automatic steering valve connection 304 and the steering cylinder connection 306 does not significantly displace the piston 308. In other words, hydraulic fluid flow between the first and second fluid connections displaces the piston 308 while hydraulic fluid flow between the second and third fluid connections does not significantly displace (e.g., does not displace) the piston 308 from the default position. As a result, in an automated mode, the hydraulic fluid flow effectively bypasses the piston 308 and/or a significant portion of the piston 308.

According to the illustrated example, to bi-directionally displace the piston 308 in an upward and downward direction (in the view of FIG. 3A), hydraulic fluid moves between the steering valve connection (e.g., a first fluid connection) 302 and the steering cylinder connection (e.g., a second fluid connection) 304 (in either direction), thereby causing a pressure differential of the piston 308 that moves the piston 308 against the springs 318 and along the guide rod 316 in a linear movement (e.g., a linear direction). In particular, the piston 308 is displaced relative to the proximity detection sensor 322 as well as the magnet 324. As a result, the detection portion 312 of the illustrated example is also moved away from the proximity detection sensor 322. As mentioned above, the piston 308 is not significantly displaced and/or displaced when hydraulic fluid flows between the automatic steering valve connection (e.g., a third fluid connection) 304 and the steering cylinder connection 306 such as during an automated hydraulic control of the steering cylinder 212.

To detect a displacement of the piston 308 away from its default position, the proximity detection sensor 322 of the illustrated example measures a change in a magnetic field (i.e., a magnetic field change) from the magnet 324 when the detection portion 312 moves away from the sensor 322 in either an downward or upward direction (in the view of FIG. 3A) (e.g., a bi-directional movement).

To center the piston 308 to the default position when hydraulic fluid is not flowing between the steering valve connection 302 and the steering cylinder connection 306 (e.g., when steering control is not being manually directed by a user), fluid reservoirs and/or fluid gaps of relatively static hydraulic fluid build at ends (e.g., opposing ends) 330 of the piston 308, thereby balancing/centering the piston 308 to the default position in which the detection portion 312 is relatively close to the sensor 322 and/or the magnet 324. In some such examples, no springs 318 are used. Additionally or alternatively, the springs 318 return the piston 308 to the default position.

In some examples, the piston 308 has different magnetic properties along its length so that the proximity detection sensor 322 may determine which direction the piston 308 and/or the detection portion 312 have moved (e.g., a direction of movement) relative to the default position. In some examples, a reed switch is used to detect movement/displacement of the piston 308. In some examples, multiple magnetic field sensors 322 are used to determine a specific directional movement of the piston 308 (e.g., upward or downward in the view of FIG. 3A). In some examples, the piston 308 exhibits a magnetic field asymmetry about its default position and/or the detection portion 312 such that the magnetic field sensor 322 can determine what direction the piston 308 has displaced toward.

In some examples, there is no detection portion 312 and the proximity detection sensor is used to determine a displacement of the piston 308 based on an expected change in a detected field associated with an overall geometry of the piston 308 (e.g., an asymmetry of a magnetic field based on the piston 308 moving away from the default and/or centered position). In some examples, the detection portion 312 is sized and/or shaped to extend into the hydraulic fluid to facilitate movement of the piston 308 along with the hydraulic fluid flow.

Figure 3B:
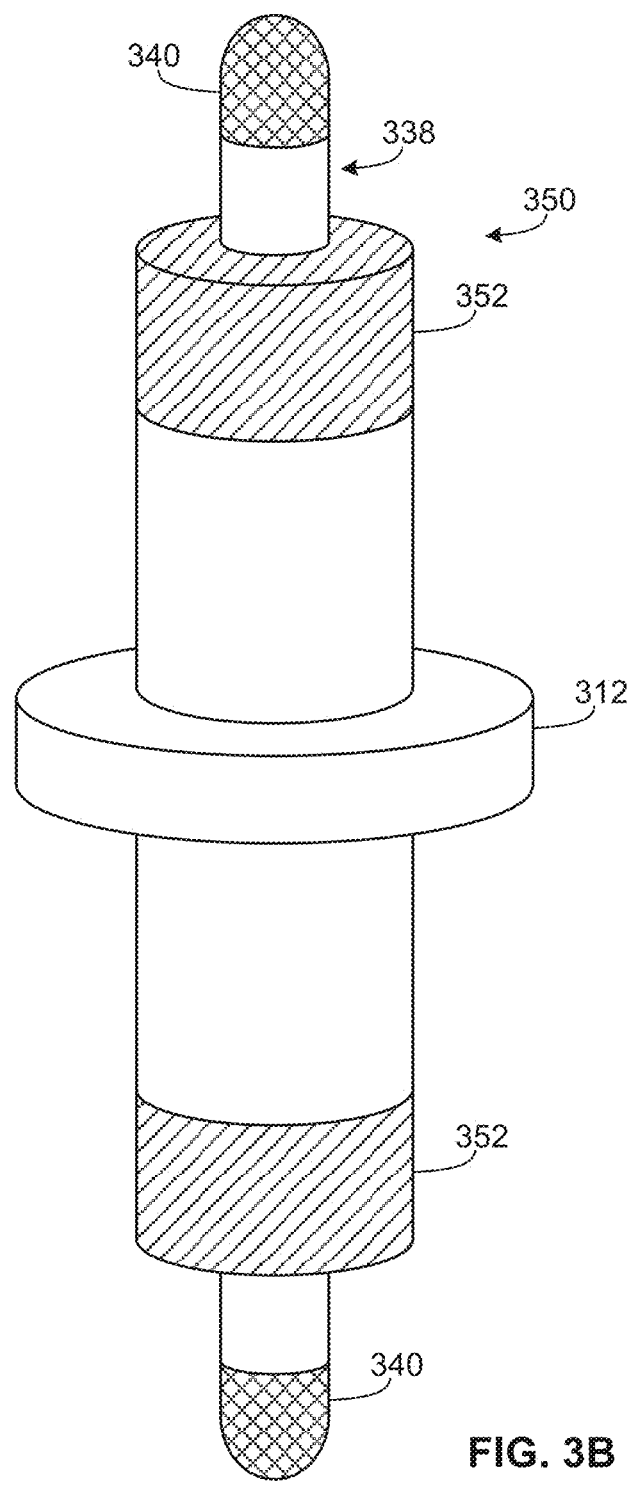
FIGS. 3B and 3C illustrate alternate piston and rod assemblies that may be implemented in the examples disclosed herein.
Figure 3C:
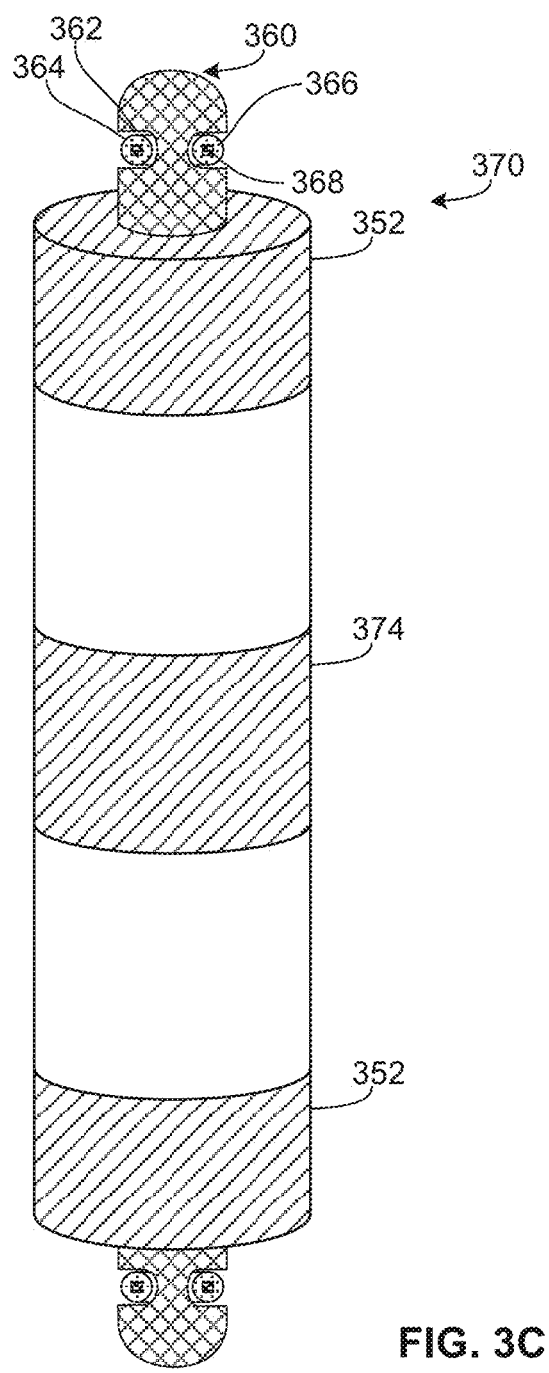

FIGS. 3B and 3C illustrate alternate piston and guide rod assemblies that may be implemented in the examples disclosed herein. Turning to FIG. 3B, an example alternative piston-guide rod assembly is shown that includes a guide rod 338 disposed in a central opening of a piston 350. In this example, the piston 350 moves and/or slides along (e.g., relative to) the guide rod 338. The example guide rod 338 includes opposing magnetic portions 340. The piston 350 of the illustrated example includes the aforementioned detection portion 312 shown in FIG. 3. In some examples, the piston 350 includes opposing magnetic portions 352, which may be magnetized portions or assembled magnets, for example.

According to the illustrated example of FIG. 3B, the magnetic portions 340, which may be magnetized portions of the guide rod 338 or an assembled magnet, repel the piston 350 to its default centered position. For example, the opposing magnetic forces caused by the magnetic portions 340 may be used to repel the piston 350 into its default position. In some examples, the piston 350 does not have the magnetic portions 352 and the magnetic portions 340 are able to repel a material that the piston 350 is at least partially composed of (e.g., a metal material).

Turning to FIG. 3C, yet another example alternative piston-guide rod assembly is shown. According to the illustrated example, a guide rod 360 is shown disposed within a piston 370, which moves (e.g., slides) along the guide rod 360 (e.g., is guided by the guide rod 360). The guide rod 360 of the illustrated example includes a groove (e.g., an annular groove) 362, in which a magnet component/assembly 364 is disposed. The example magnet component/assembly 364 includes a substrate 366, which may be composed of an oil-resistant and/or temperature tolerant plastic such as nylon, a fluoroplastic and/or dielectric material, etc. The example magnet assembly 364 also includes one or more embedded magnets 368 embedded within the substrate 366. In some examples, the piston 370 includes the magnetic portions 352 shown in FIG. 3B. The piston 370 of the illustrated example also includes a magnetic detection portion 374, which may be defined by magnetizing a portion of the piston 370 and/or assembling magnetic components to the piston 370. For clarity, the guide rod 360 as well as its associated components are shown in a partial cut view in the view of FIG. 3C.

Similar to the illustrated example of FIG. 3B, the opposing magnet component/assemblies 364 are used to cause a centering of the piston 370 to its default position as the piston 370 slides along and/or is guided by the guide rod 360. In some examples, the magnet component/assemblies 364 on opposing sides of the guide rod 360 repel the respective magnetic portions 352 to center the piston 370 along a length of the guide rod 360.

In contrast to the detection portion 312 shown in FIGS. 3A and 3B, the example magnetic detection portion 374 does not extend from an outer surface of the guide rod 360. In other examples, the magnet component/assembly 364 is disposed in a groove of the guide rod 360 that is located at or proximate a center portion of a length of the piston 370. In some other examples, the magnetic component/assembly 364 is embedded within the piston 370 (e.g., within an internal annular groove on an internal diameter of the piston 370 for detection and/or centering purposes).

Any of the examples disclosed in FIGS. 3A-3C may be used in conjunction with another. For example, the guide rod 316 may have the magnetic detection portion 374 instead of the detection portion 312. Similarly, any of the features described may be used on any of the examples, as appropriate.

Figure 4:
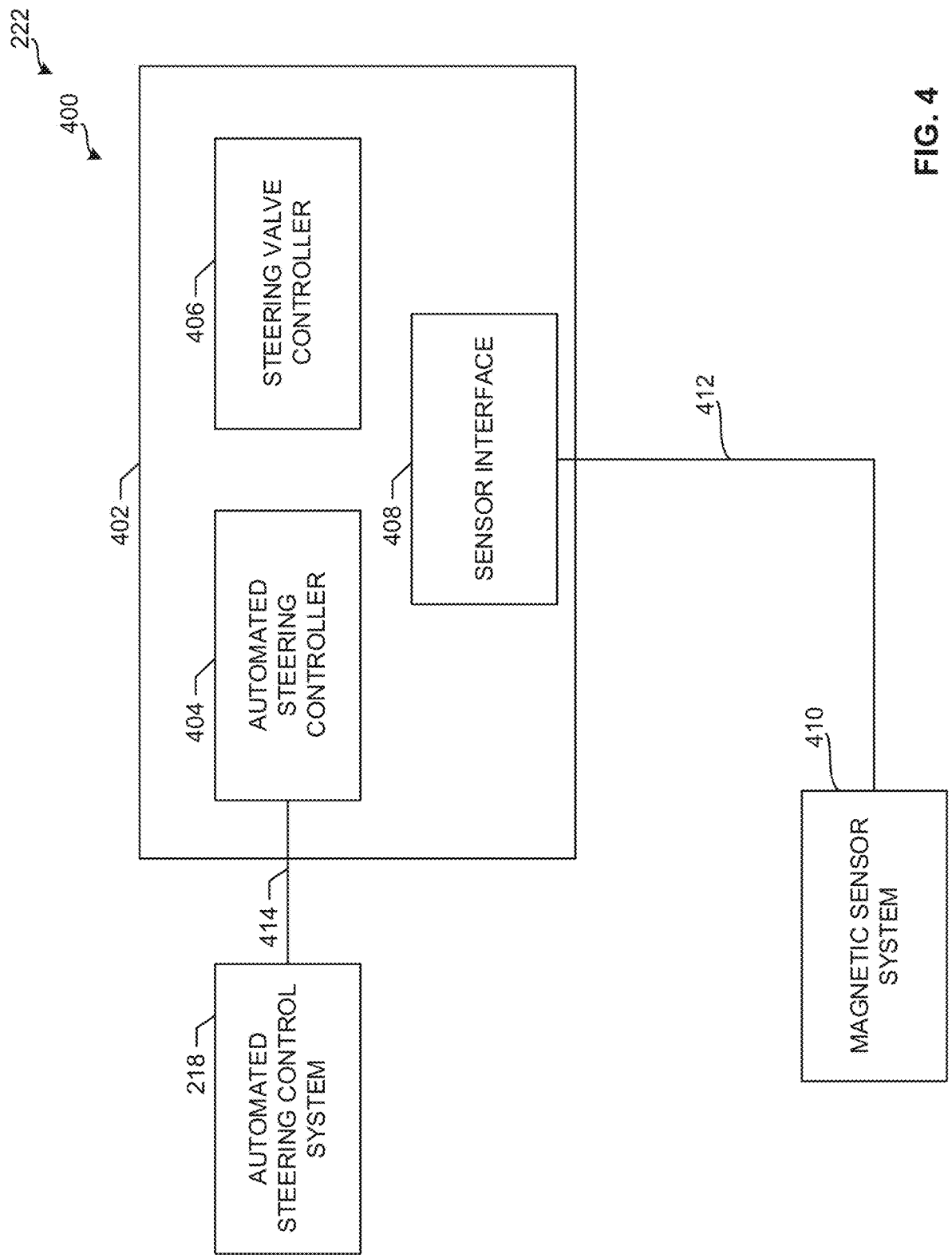
FIG. 4 is an example hydraulic steering system that may be used to implement the examples disclosed herein.

FIG. 4 is an example hydraulic system 400 that may be used to implement the examples disclosed herein. The example hydraulic steering system 400, which may be implemented in the engagement controller 222 of FIG. 2, includes a steering control 402, which includes an automated steering controller (e.g., an automated steering controller) 404, a steering valve controller (e.g., a manual steering controller) 406 and a sensor interface 408. In this example, the sensor interface 408 is communicatively coupled to a magnetic sensor system 410 via a communication line 412. Further, the automated steering controller 404 of the illustrated example is communicatively coupled to the automated steering control system 218 via a communication line 414.

In operation, the steering control 402 switches between the automated steering controller 404 and the steering valve controller 406 based on whether a user has engaged the steering valve controller 406. The sensor interface 408 of the illustrated example utilizes the bi-directional flow switch 300 and/or the sensor 322 to determine whether the user has engaged manual control. In turn, the steering control 402 may engage/dis-engage the automated steering controller 404. In some examples, the steering control 402 may dis-engage the steering valve controller 406.

While a magnetic sensor is described in the examples described, any appropriate positional and/or proximity sensor may be used. For example, an optical detector may be used to measure displacement of the piston 308. In some examples, a laser system may be used to detect movement/displacement of the piston 308.

Figure 5:
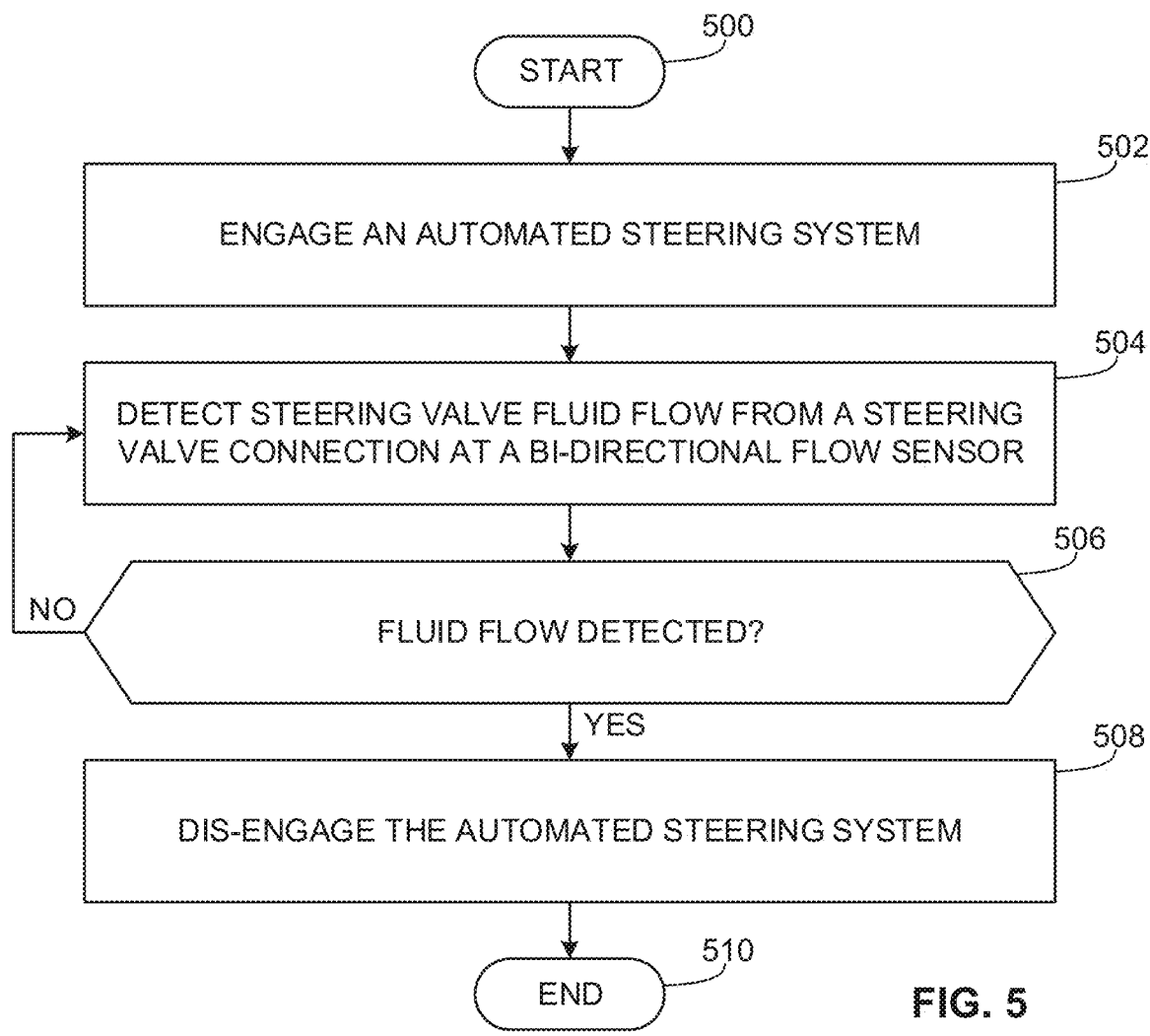
FIG. 5 is a flowchart representative of an example method that may be implemented by the example hydraulic steering system of FIG. 4.

While an example manner of implementing the example hydraulic steering system of FIG. 4 is illustrated in FIG. 5, one or more of the elements, processes and/or devices illustrated in FIG. 5 may be combined, divided, re-arranged, omitted, eliminated and/or implemented in any other way. Further, the example steering control 402, the example automated steering controller 404, the example steering valve controller 406, the example sensor interface 408, the example magnetic sensor system 410 and/or, more generally, the example hydraulic steering system 400 of FIG. 4 may be implemented by hardware, software, firmware and/or any combination of hardware, software and/or firmware. Thus, for example, any of the example steering control 402, the example automated steering controller 404, the example steering valve controller 406, the example sensor interface 408, the example magnetic sensor system 410 and/or, more generally, the example hydraulic steering system 400 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, steering control 402, the example automated steering controller 404, the example steering valve controller 406, the example sensor interface 408, and/or the example magnetic sensor system 410 is/are hereby expressly defined to include a tangible computer readable storage device or storage disk such as a memory, a digital versatile disk (DVD), a compact disk (CD), a Blu-ray disk, etc. storing the software and/or firmware. Further still, the example hydraulic steering system 400 of FIG. 4 may include one or more elements, processes and/or devices in addition to, or instead of, those illustrated in FIG. 5, and/or may include more than one of any or all of the illustrated elements, processes and devices.

A flowchart representative of example machine readable instructions for implementing the hydraulic steering system 400 of FIG. 4 is shown in FIG. 5. In this example, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example hydraulic steering system 400 may alternatively be used. For example, the order of execution of the blocks may be changed, and/or some of the blocks described may be changed, eliminated, or combined.

As mentioned above, the example process of FIG. 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method of FIG. 5 begins at block 500 where a vehicle such as the working machine 100 of FIG. 1 is being operated (block 500). The vehicle of the illustrated example has automated navigation (e.g., self-driving capabilities). In this example, the automated steering controller 404 causes hydraulic fluid to flow between the automatic steering valve connection 304 and the steering cylinder connection 306 at a controlled pressure and/or flow rate.

In this example, an automated steering system is engaged (block 502). In particular, the example steering control 402 has enabled the automated steering controller 404 to direct the vehicle (e.g., based on visual sensor data and/or GPS).

According to the illustrated example, hydraulic steering valve fluid flow is detected at a bi-directional flow sensor (block 504). In particular, the proximity detection sensor 322 communicates with the sensor interface 408 and/or the magnetic sensor system 410 to indicate detected movement of the piston 308 away from its respective default (e.g., centered position). In this example, the movement of the piston 308 is caused by hydraulic fluid flowing between the steering valve connection 302 and the steering cylinder connection 306.

If hydraulic fluid flow is not detected (block 506), control of the process returns to block 504. Otherwise, if hydraulic fluid flow is detected (block 506), the automated steering system is dis-engaged (block 508) and the process ends (block 510). In this example, the automated steering system is dis-engaged by the steering control 402 and/or the sensor interface 408.

Figure 6:
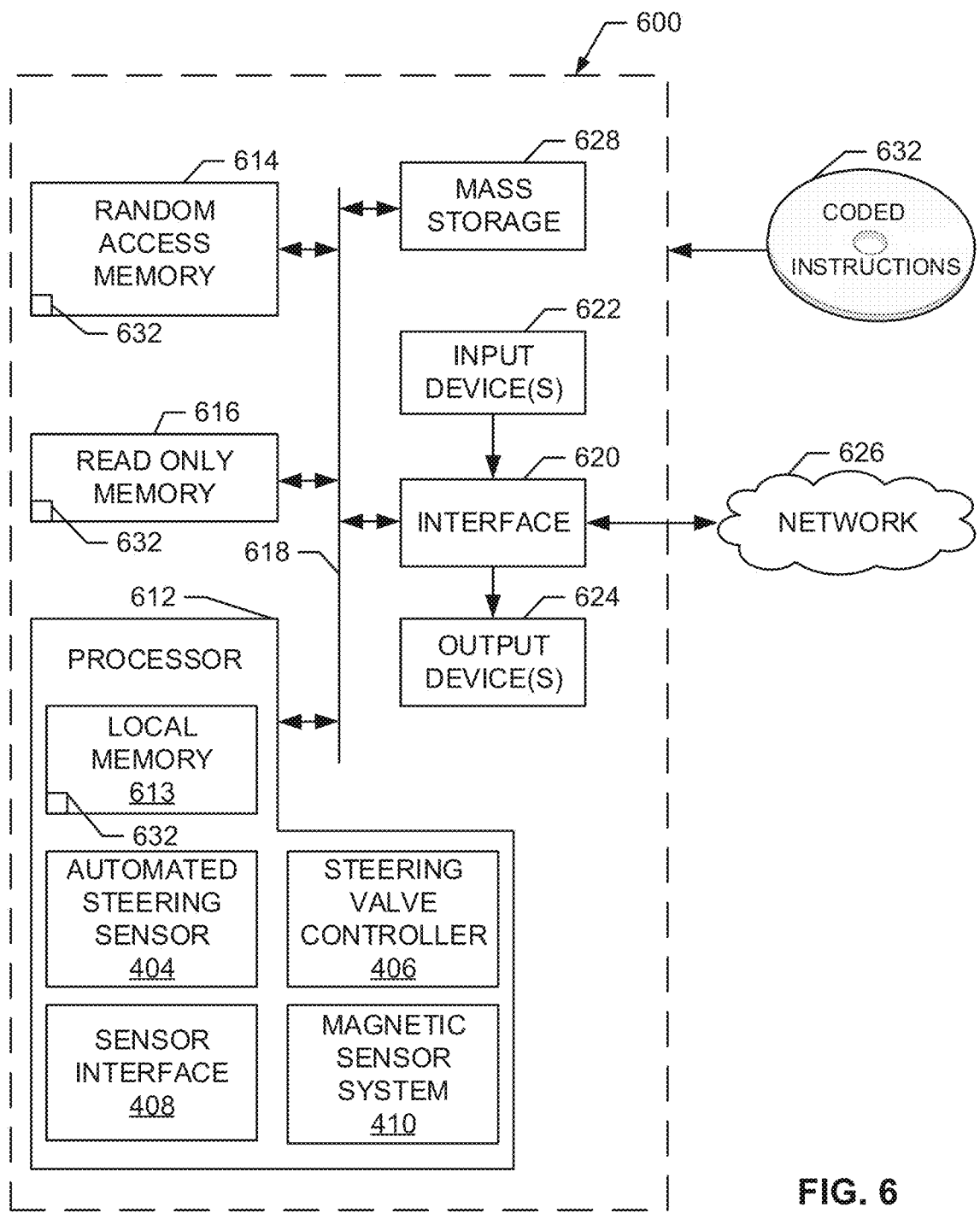
FIG. 6 is a processor platform that may be used to execute the example method of FIG. 5.

FIG. 6 is a block diagram of an example processor platform 600 capable of executing the instructions of FIG. 5 to implement the example hydraulic steering system 400 of FIG. 4. The processor platform 600 can be, for example, a server, a personal computer, a mobile device (e.g., a cell phone, a smart phone, a tablet such as an iPad™), a personal digital assistant (PDA), a digital video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). In this example the processor 612 also includes the example steering control 402, the example automated steering controller 404, the example steering valve controller 406, the example sensor interface 408 and the example magnetic sensor system 410. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIG. 5 may be stored in the mass storage device 628, in the volatile memory 614, in the non-volatile memory 616, and/or on a removable tangible computer readable storage medium such as a CD or DVD.

An example apparatus includes a piston disposed in a fluid channel that is between a first fluid connection and a second fluid connection, where the first and second fluid connections define a fluid pathway for hydraulic steering fluid. The example apparatus also includes a detector to detect a movement of the piston away from a default position of the piston, where the piston is to displace from the default position when the hydraulic steering fluid flows along the fluid pathway.

An example method includes detecting movement of a piston away from a default position of the piston, where the piston is disposed in a fluid channel that fluidly couples a first fluid connection and a second fluid connection, and where hydraulic steering fluid moves between the first and second fluid connections to cause the movement of the piston. The example method also includes dis-engaging, based on the detected movement of the piston, an automated steering system.

An example hydraulic steering system includes a steering valve defining a first fluid connection, a steering cylinder defining a second fluid connection, where hydraulic steering fluid moves between the first and second fluid connections. The example hydraulic system also includes a piston disposed in a fluid channel between the first and fluid second fluid connections. The piston is bi-directionally movable along a linear path when the hydraulic steering fluid flows between the first and second fluid connections. The example apparatus also includes a detector to detect the bi-directional movement of the piston away from a default position of the piston and a processor communicatively coupled to the detector, where the processor is to interpret the movement of the piston.

From the foregoing, it will be appreciated that the above disclosed methods and apparatus enable cost-effective detection steering/control engagement that can utilize detection of a movable object that can withstand relatively high pressures.

This patent arises as a divisional of U.S. patent application Ser. No. 15/274,722, which was filed on Sep. 23, 2016 and which claims the benefit under 35 U.S.C. § 119(e) to U.S. Provisional Application 62/371,909 titled "HYDRAULIC BI-DIRECTIONAL FLOW SWITCHES," filed Aug. 8, 2016. The foregoing applications are hereby incorporated herein by this reference in their entireties.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed are related to vehicle and/or working machines, the example disclosed may be used for any appropriate hydraulic application.

What is claimed is:

1. A method comprising:
    detecting movement of a piston from a default position of the piston, the piston disposed in a fluid channel that fluidly couples a first fluid connection and a second fluid connection, wherein hydraulic steering fluid moves between the first and second fluid connections to cause the movement of the piston;
    dis-engaging, based on the detected movement of the piston, an automated steering system; and
    centering the piston to the default position when the hydraulic steering fluid is not moving between the first and second fluid connections, wherein centering the piston occurs via a magnetic portion on at least one of the piston or a guide rod to guide the piston.

2. The method as defined in claim 1, wherein the piston is centered to the default position by a spring.

3. The method as defined in claim 1, further including detecting a direction of movement of the piston.

4. The method as defined in claim 1, wherein detecting movement of the piston includes detecting a magnetic field change corresponding to movement of a detection portion of the piston.

5. A hydraulic steering system comprising:
a steering valve defining a first fluid connection;
a steering cylinder defining a second fluid connection, wherein hydraulic steering fluid moves between the first and second fluid connections;
a piston disposed in a fluid channel between the first and fluid second fluid connections, the piston bi-directionally movable along a linear path when the hydraulic steering fluid flows between the first and second fluid connections;
a detector to detect the bi-directional movement of the piston away from a default position of the piston;
a processor communicatively coupled to the detector, the processor to interpret the movement of the piston, and
a guide rod to guide the bi-directional movement of the piston via a bore of the piston.

6. The hydraulic steering system as defined in claim 5, further including an automated steering control system fluid source that defines a third fluid connection, the third fluid connection fluidly coupled to the first and second fluid connections.

7. The hydraulic steering system as defined in claim 5, wherein the detector detects a direction of movement of the piston.

8. The hydraulic steering system as defined in claim 5, wherein the detector includes a magnetic field sensor or a reed switch sensor.

9. The hydraulic steering system as defined in claim 5, further including a spring to at least partially center the piston to the default position.

10. The hydraulic steering system as defined in claim 5, wherein the guide rod includes a magnetic portion to center the piston to the default position.

11. The hydraulic steering system as defined in claim 5, wherein the guide rod includes a groove to retain a magnet, wherein the magnet is to center the piston to the default position.

12. The hydraulic steering system as defined in claim 5, wherein the piston includes a magnetic portion.

13. A hydraulic steering system comprising:
a steering valve defining a first fluid connection;
a steering cylinder defining a second fluid connection, wherein hydraulic steering fluid moves between the first and second fluid connections;
a piston disposed in a fluid channel between the first and fluid second fluid connections, the piston bi-directionally movable along a linear path when the hydraulic steering fluid flows between the first and second fluid connections;
a detector to detect the bi-directional movement of the piston away from a default position of the piston;
a processor communicatively coupled to the detector, the processor to interpret the movement of the piston; and
an automated steering control system fluid source that defines a third fluid connection, the third fluid connection fluidly coupled to the first and second fluid connections, wherein the hydraulic fluid moves between the second fluid connection and the third fluid connection when fluid flows between the second and third fluid connections.

\* \* \* \* \*